Aug. 23, 1938.  G. G. GREULICH  2,127,685
WELDED JOINT
Filed July 30, 1936
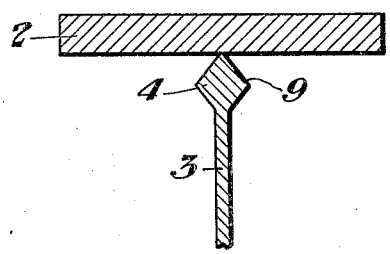
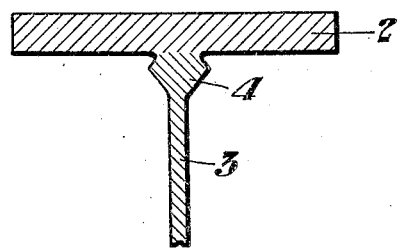
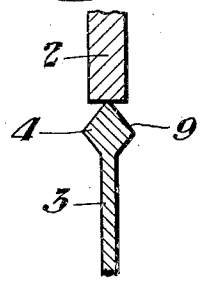
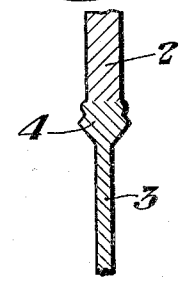
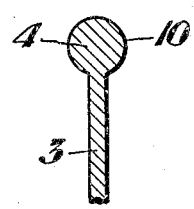
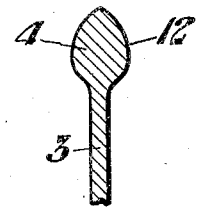
Inventor:
GERALD G. GREULICH,
by: Usina & Rauber
his Attorneys Patented Aug. 23, 1938

2,127,685

UNITED STATES PATENT OFFICE 2,127,685

WELDED JOINT

Gerald G. Greulich, Mount Lebanon, Pa.

Application July 30, 1936, Serial No. 93,482

1 Claim. (Cl. 113—112)

The present invention relates to a method of welding the edges of metals having dissimilar thicknesses to produce a homogeneous weld.

Numerous attempts have been made to produce a welded joint of metals having dissimilar thicknesses by means of electrical resistance or heat generation between the two metals, but experience has shown that the metal having the least thickness would fuse or burn out before the point of contact on the thicker metal would reach welding temperature.

By the present method, this difficulty has been overcome and other objects and advantages will become apparent as the description proceeds in which, Figure 1 is a section through metals having dissimilar thicknesses showing the contact point before welding.

Figure 2 is a section showing the contact point after the metals have been welded, Figure 3 is a view showing edge to edge contact of the dissimilar thicknesses of metal prior to welding, Figure 4 is a view of Figure 3 after the metals have been welded, Figure 5 is a detailed section of another form of enlarged head, and Figure 6 is a detailed section of still another form of enlarged head.

The present method resides in joining or welding the edges of metals having dissimilar thicknesses by so shaping the metal having the less thickness at its point of contact with the other metal that heat absorption or transmission at the point of contact of the two metals is substantially uniform throughout. This produces a joint having a homogeneous weld.

To more specifically disclose the invention, the drawing shows a metallic member 2 of substantial thickness and a metallic member 3 of considerably less thickness having its edge enlarged or upset as at 4 to provide a contact engaging portion substantially equal in thickness to the metal to which it is to be joined or welded. This enlarged portion 4 will absorb substantially the same amount of heat at its contact point as the metal member 2 and will result in the metals reaching the fusing point at substantially the same time whereby a homogeneous weld will be produced.

The enlarged head portion 4 may be square or diamond shaped as shown specifically at 9 or it may assume a cylindrical contour as shown at 10 or a spear shaped portion as shown at 12. Figure 1 shows the metal member 2 in contact position for being welded to the enlarged head portion 4 of the metallic member 3 prior to the application of heat for affecting the weld between the two metals. Figures 2 and 4 show substantially the formation of the homogeneous weld produced between the metallic member 2 and the enlarged head 4 on member 3 after these metals have been welded together.

It is therefore apparent, that by providing an enlarged head portion on the metal having the less thickness, it is possible to join or weld two metals together even though they are of dissimilar thicknesses due to the fact that the enlarged head 4 is substantially the same thickness as the thicker metal, and fusion of the metals will take place at substantially the same time.

While I have shown and described one species of the invention, it is to be understood that I do not wish to be limited exactly thereto, since various modifications may be made without departing from the scope of the common claim.

I claim:

The method of butt welding metals having dissimilar thicknesses which consists in providing at least one of the edges of the metal having the least thickness with a diamond-shaped enlargement whose greatest thickness is substantially equal to the thickness of the other metal to which it is to be welded, the surface of the other metal being so shaped that a line contact is produced between the metals and provision is made for a uniform heat absorption by both of said metals and welding said metals at the line of contact.

GERALD G. GREULICH.